Nov. 19, 1935.    F. W. JARVIS    2,021,858
CONTROL FOR MOTOR VEHICLES
Filed May 28, 1932    3 Sheets-Sheet 3

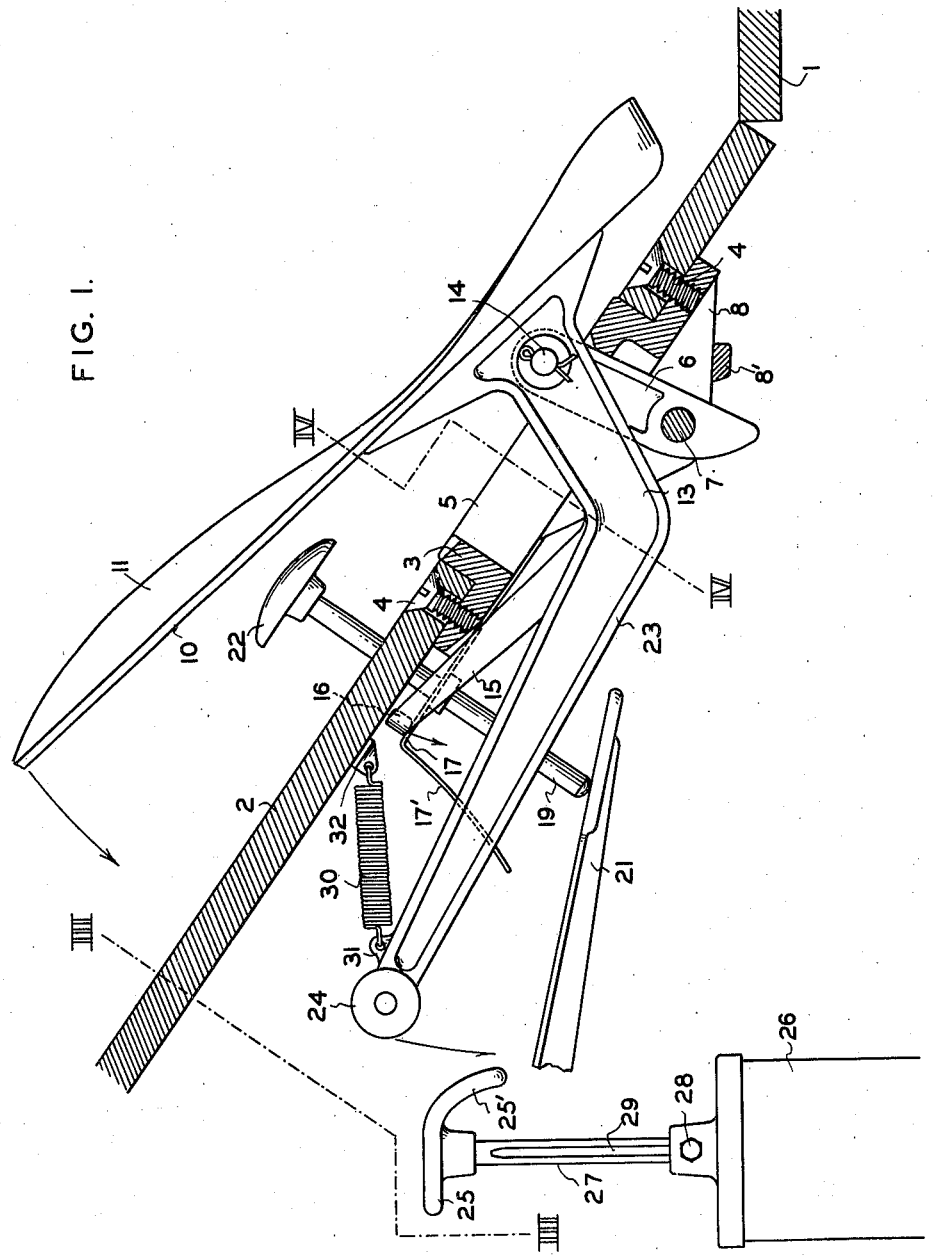

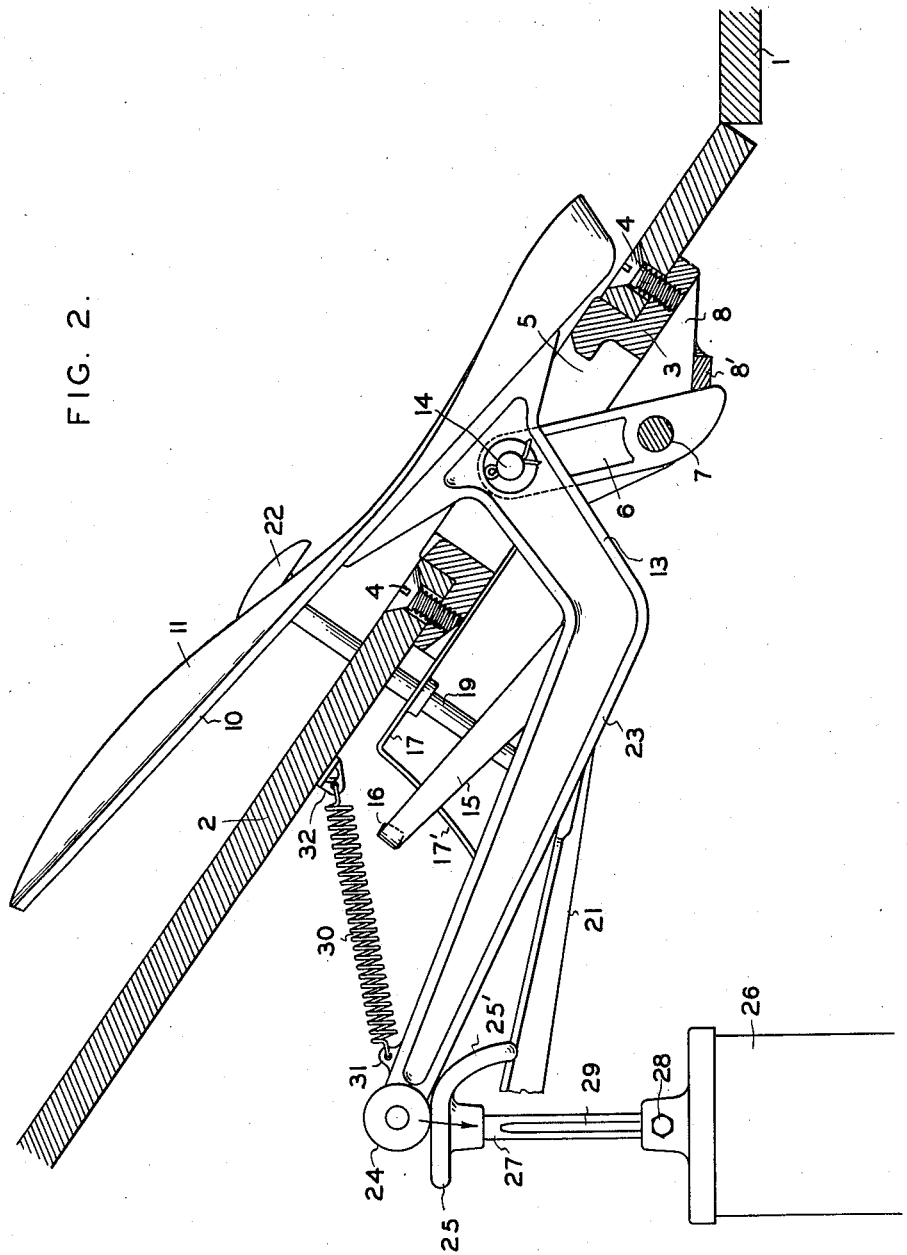

INVENTOR.
FRANKLIN W. JARVIS
BY
ATTORNEY.

Patented Nov. 19, 1935

2,021,858

UNITED STATES PATENT OFFICE 2,021,858

CONTROL FOR MOTOR VEHICLES

Franklin W. Jarvis, Oakland, Calif.

Application May 28, 1932, Serial No. 614,171

8 Claims. (Cl. 192—3)

This invention relates to improvements in controls for motor vehicles and more particularly to a combined brake and throttle control.

The principal object of the invention is to control both the engine throttle and the brakes by the selective operation of a single pedal.

Another object is to obviate the necessity for shifting the operator's foot as required in operating separate pedals in the conventional throttle and brake controls.

Another object is to render possible the instantaneous application of the brakes at any moment in the operation of the vehicle.

Another object is to so arrange the unified control pedal that it may be operated with the minimum of physical exertion.

A further object is to render the control unit simple and compact in design and reliable in operation.

The major advantage of the present invention is the elimination of the loss of time occasioned by the shifting of the foot between separate control pedals. Since this time loss occurs at the most critical moments in the operation of the vehicle, its elimination greatly facilitates proper control over the vehicle at all times. Under modern high speed conditions, it is obvious that the vehicle may travel many yards during the shifting of the foot before the desired brake control can be operated.

Other objects and advantages appear as the description progresses.

In this specification and the accompanying drawings, the invention is disclosed in its preferred form. It is, however, to be understood that it is not limited to this form because it may be embodied in other forms without departing from the spirit of the invention as defined in the claims following the description.

In the accompanying three sheets of drawings:

Fig. 1 is a side elevation partly in vertical section of a control unit constructed in accordance with this invention.

Fig. 2 is a similar view of the same in braking position.

Figure 4:
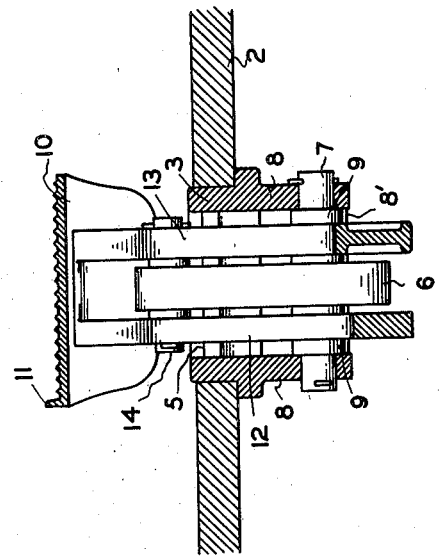
Fig. 4 is a similar view taken along the line IV—IV in Fig. 1, showing the mounting of the control pedal.

In detail, the construction illustrated in the drawings, referring more particularly to Figs. 1 and 2, comprises the usual horizontal floor board 1 with the inclined floor board 2 rising from the front edge thereof. The bracket 3 is secured to the floor board 2 by the screws 4—4 and has the central opening 5 therethrough.

The link 6 pivots on the pin 7 mounted in the lugs 8—8 depending from opposite sides of the bracket. The spacing sleeves 9 (see also Figs. 3 and 4) encircle the pin 7 to maintain the link 6 in proper longitudinal position within the central opening 5 of the bracket. The stop 8' is integral with the lugs 8—8 and is adapted to be contacted by the end of the link 6 to limit its forward swing.

The pedal 10 is shaped to conform to the foot of the operator and is provided with the side flange 11 to guard against accidental lateral displacement of the foot. The surface of the pedal 15 is preferably rendered non-slipping by knurling or gridding, as shown in Fig. 4. The yoke arms 12—13 are integral with or otherwise permanently attached to the underside of the pedal 10 and extend downward through the bracket opening 5 on opposite sides of the link 6. The pedal assembly 10, 12—13 is pivoted on the upper end of the link by the pin 14 passing therethrough.

Figure 3:
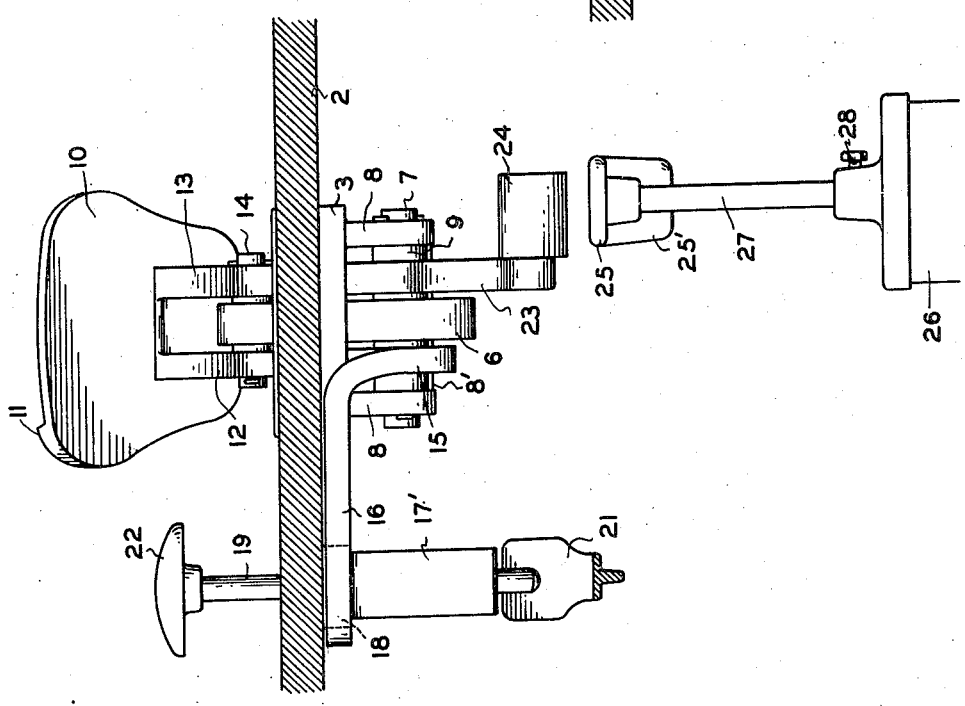
Fig. 3 is a transverse vertical section of the same taken along the line III—III in Fig. 1.

The arm 12 extends laterally at 15 and has the bent end 16 operatively engaging over the spring plate 17 having one end anchored on the base 18 (see also Fig. 3). The push rod 19 is fixed in the plate 17 and guided in the floor board, and extends downward into operative engagement with the lever 21. This lever through the usual interposed connections operates the engine throttle (not shown). The end of the plate 17 is bent abruptly downward to form the curved guard 17' for a purpose later to be described. If deemed necessary, an auxiliary accelerator button 22 may be provided at the upper end of the rod 19, as shown, to supplement the operation of the pedal 10, by independent foot control.

The precise form of the throttle control will vary with the make and model of the vehicle. It will, however, be obvious to those skilled in the art that the push rod 19 and the lever 21 may be modified to cooperate with any of the conventional forms of throttle controls.

The lever arm 13 extends laterally at 23 and has the roller 24 mounted at its end in longitudinal alignment with the plunger head 25. The plunger rod 27 has the head 25 fixed thereon and descends into the hydraulic brake actuating element 26. The lip 25' is integral with the head 25 and curves downwardly therefrom adjacent the roller 24 to guide the roller into proper operating position on top of the head 25 as shown in Fig. 2. The set screw 28 engages in the spline 29 in the plunger rod 27 to maintain the lip 25' in alignment adjacent the roller 24.

The hydraulic brake control element 26 could obviously be substituted by an operating lever for mechanical brakes or a controlling valve for vacuum or other power operated brakes. The present control unit can be modified to cooperate with any of the usual braking systems without departing from the spirit of the invention. In the interest of simplicity, the present disclosure is limited to the major essentials of the invention.

The spring 30 contracts between the projection 31, on the lever arm 23 and the lug 32, secured to the floor board 2. This exerts a rearward thrust on the lever arm 23—13, urging the link 6 into the primary position shown in Fig. 1. The spring also swings the lever arm 23—13 upward on its pivot 14 to urge the pedal 10 to assume the inoperative position.

The control unit operates substantially as follows: The unit as shown in Fig. 1 is in its primary position with the lever end 16 operatively engaging over the end of the spring plate 17. The pedal is thus in the primary or accelerating position and adapted to be depressed to operate the throttle control 21.

To accomplish this result, the operator's foot is placed on the pedal 10 and flexed from the ankle. This depresses the ball of the foot and slightly elevates the heel to swing the pedal 10 on its pivot 14. The lever end 16 is thus forced downward against the spring plate 17 and advances the push rod 19 to displace the throttle control lever 21 to secure the desired engine speed. It is to be noted that the roller 24 in its retracted position, as shown in Fig. 1, is completely disengaged from the cooperating plunger head 25. The braking system thus remains in its normal inoperative condition during the operation of the throttle.

The control unit is advanced into the braking position shown in Fig. 2 by straightening the knee to move the operating foot straight forward. The pedal 10 advances into its secondary position by swinging the link 6 forward on its pivot 7 until its movement is arrested by contacting the stop 8'. This movement slides the lever end 16 beyond the turned-down end of the plate 17, thus becoming inoperatively disengaged from the throttle control lever 21. The pedal 10 may then be operated without displacing the lever 21 or affecting the engine throttle.

The lever arm 23 is also thrust forward by the movement of the pedal 10 on the pivots 7—14 and the roller 24 is advanced into operative engagement over the plunger head 25 as illustrated in Fig. 2. To apply the brakes, the pedal 10 is tilted on its pivot 14 by the flexing of the operator's ankle to lower the roller 24 as indicated by the arrow in Fig. 2. This depresses the plunger 25—27 into the hydraulic pressure cylinder 26 and applies the brakes in the conventional manner.

Attention is directed to the fact that the brakes are applied by operating the pedal 10 from both the knee and ankle. This permits the operator to easily regulate the desired pressure to be exerted on the brakes by the sensitively controlled muscles of the ankle. The cooperation of the more powerful muscles of the knee and thigh provides sufficient muscular force to effect rapid and complete application of the brakes when necessary.

The control unit is restored to the initial position shown in Fig. 1 by releasing the pressure of the foot. The spring 30 then contracts and swings the lever arm 23 upward on its pivot 14 to restore the pedal 10 into its inoperative position. The contraction of the spring 30 also swings the link 6 backward on its pivot 7 and re-engages the lever end 16 over the throttle controlling plate 17. The depending curved guard 17' serves to guide the lever end 16 into proper operative position above the plate 17.

Attention is directed to the fact that the lever end 16 can be disengaged from the spring plate 17 at any point in its cooperation therewith. The control unit thus may be advanced into braking position at any time, irrespective of the position of the throttle lever 21. When the lever end 16 is thus disengaged from engagement with the throttle control, the spring plate 17 immediately retracts the push rod 19 and permits the closing of the engine throttle. The curved lip 25' guides the roller 24 into operative position above the plunger head 25 should the unit be advanced into braking position with the pedal 10 partially depressed.

Having thus described this invention, what I claim and desire to secure by Letters Patent is:

1. In a motor vehicle having brake and throttle controls; a fixed bracket; a link having its lower end pivoted on said bracket; an actuating pedal pivoted on the upper end of said link parallel to the lower pivot thereof; lever arms fixed on said pedal and selectively engageable and disengageable with said throttle and brake controls by movement of said link; stops limiting the movement of said link; said pedal being adapted to be depressed forwardly to operate the control selected.

2. In a motor vehicle having brake and throttle controls; an actuating pedal having lever arms mounted thereon adapted to operate either of said controls when the forward end of said pedal is depressed; and means for moving said pedal longitudinally to cause said lever arms to engage or disengage said brake and throttle controls selectively.

3. In a motor vehicle having brake and throttle controls; an actuating pedal having means adapted to operate either of said controls when the forward end of said pedal is depressed; and means for moving said pedal longitudinally to cause said operating means to engage or completely disengage said brake and throttle controls selectively.

4. In a motor vehicle having brake and throttle controls; a pivoted link; an actuating pedal pivoted on said link parallel to the pivot of the link and having means adapted to operate either of said controls when the forward end of said pedal is depressed, said link being movable in two directions to cause said operating means to engage or completely disengage said brake and throttle controls selectively.

5. In a motor vehicle having brake and throttle controls; a bracket; a link pivoted on said bracket; an actuating pedal pivoted on said link parallel to the pivot of the link; lever arms fixed on said pedal and adapted to operate either of said controls when the forward end of said pedal is depressed, said link being movable in two directions to cause said lever arms to engage or disengage said brake and throttle controls selectively.

6. In a motor vehicle having brake and throttle controls; a bracket; a link having its lower end pivoted to said bracket; an actuating pedal pivoted on the upper end of said link parallel to the lower pivot thereof; lever arms extending from said pedal and adapted to operate either of said controls when the forward end of said pedal is depressed; said link being movable in two directions to cause said lever arms to engage or completely disengage said brake and throttle controls selectively.

7. In a motor vehicle having a floor board with brake and throttle controls therebeneath; a bracket; a link extending through said floor board and having its lower end pivoted on said bracket; an actuating pedal pivoted on the upper end of said link; lever arms fixed to said pedal adjacent said link and extending through said floor board and adapted to operate either of said controls when said pedal is depressed forwardly, said link being movable in two directions to cause said lever arms to engage or disengage said brake and throttle controls selectively.

8. In a motor vehicle having a floor board with brake and throttle controls therebeneath; a bracket; a link extending through an opening in said floor board and having its lower end pivoted on said bracket; an actuating pedal pivoted on the upper end of said link parallel to the lower pivot thereof; lever arms fixed to said pedal adjacent said link and extending through said opening in the floor board and extending laterally therebeneath and adapted to operate either of said controls; said link being movable to cause said lever arms to engage or disengage said brake and throttle controls selectively.

FRANKLIN W. JARVIS.